Feb. 24, 1931.  W. G. MILLIGAN  1,793,817
CONTROL FOR MOTOR VEHICLES
Filed Feb. 11, 1927  6 Sheets-Sheet 1

INVENTOR.
WILLIAMS G. MILLIGAN.
BY Ely & Barrow
ATTORNEYS.

Feb. 24, 1931.  W. G. MILLIGAN  1,793,817
CONTROL FOR MOTOR VEHICLES
Filed Feb. 11, 1927  6 Sheets-Sheet 2

INVENTOR.
WILLIAMS G. MILLIGAN.
BY Ely & Barrow
ATTORNEYS.

Feb. 24, 1931.   W. G. MILLIGAN   1,793,817
CONTROL FOR MOTOR VEHICLES
Filed Feb. 11, 1927   6 Sheets-Sheet 3

INVENTOR.
WILLIAMS G. MILLIGAN.
BY Ely T Barrow
ATTORNEYS.

Patented Feb. 24, 1931

1,793,817

UNITED STATES PATENT OFFICE

WILLIAMS G. MILLIGAN, OF AKRON, OHIO

CONTROL FOR MOTOR VEHICLES

Application filed February 11, 1927. Serial No. 167,431.

This invention relates to control devices for motor vehicles employing planetary transmissions such as used in a certain make of automobile now on the market.

The general purpose of the invention is to provide in combination with the vehicle control levers, devices adapted to indicate when the clutch is neutral, to automatically lock the clutch in neutral when the brake is applied, and to lock the transmission in low speed when desired, as for example in climbing long hills, but adapted to permit automatic release of the last-named lock when the emergency brake is applied.

A lesser purpose is to so construct the devices as to permit easy and quick attachment thereof to the standard controls such as used in vehicles of this type now on the market.

The above and other purposes are obtained by the devices illustrated in the accompanying drawings and described below. It is to be understood that the invention is not limited to the particular form thereof shown and described.

Figure 1:
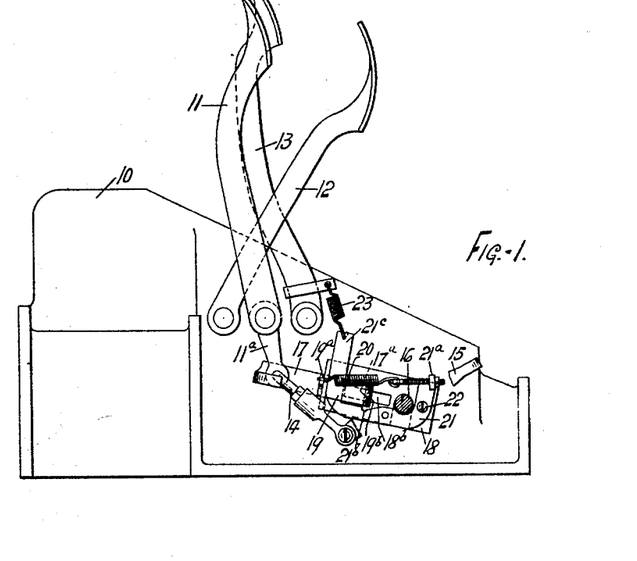
Figure 1 is a side elevation of one embodiment of the invention.
Figure 2:
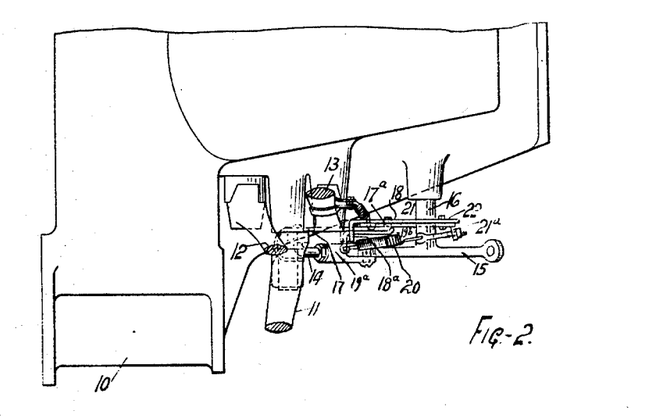
Figure 2 is a plan thereof, partly in section.

Referring to Figures 1 and 2 of the drawings, the numeral 10 indicates the usual housing for planetary transmissions and the numerals 11, 12 and 13 respectively, designate the low-speed and clutch pedal, the reverse pedal and the brake pedal. The standard adjustable link 14 connects a downwardly extending arm $11^a$ on pedal 11 to the lever 15 for operating the clutch control shaft 16.

For the purpose of indicating when the pedal 11 is in neutral position, there is also pivotally connected to arm $11^a$ of pedal 11 one end of a thrust member 17 arranged to slide through an apertured outwardly turned flange $18^a$ on a plate 18 pivotally mounted on the clutch control shaft 16. The other end of member 17 also is preferably formed with an inwardly turned tongue $17^a$ engaged in an elongated slot $18^b$ in plate 18 for guiding the thrust member 17 in its movement relative to plate 18. A yielding pawl 19 is arranged to be engaged by the advancing end of member 17 when pedal 11 is in neutral position, this pawl preferably consisting of a short plate extending through the apertured flange $18^a$ and having an outwardly turned lug $19^a$ to which is connected a tensile spring 20 which may be connected to any other suitable part of the device or to a fixed part of the transmission housing. This provides in effect, a pivotal mounting for the pawl, the other end of which at $19^b$ is bent inwardly into the path of the advancing end of the thrust member 17, the pawl thus being constructed to yield out of engagement with the end of member 17 which is rounded as shown to facilitate such action. The foregoing parts are thus designed to so resist movement of the pedal 11 through neutral position as to indicate said position.

The locking of the pedal 11 in neutral position is arranged for by pivoting a latch 21 on plate 18 as at 22. This latch may be urged to the released position shown in the drawings by connecting spring 20 to any upwardly extending arm $21^a$ thereon as shown, so that spring 20 may perform the double function of yieldingly urging pawl 19 into the path of member 17 and also yieldingly urging latch 21 to released position. Latch 21 is provided with a shoulder arranged at $21^b$ for engaging in back of tongue 17ª when the pedal 11 is in neutral position. Engagement of latch 21 is effected from the brake pedal by connecting an upwardly extending arm 21ᶜ on said latch to said pedal with a tensile spring 23.

Figure 3:
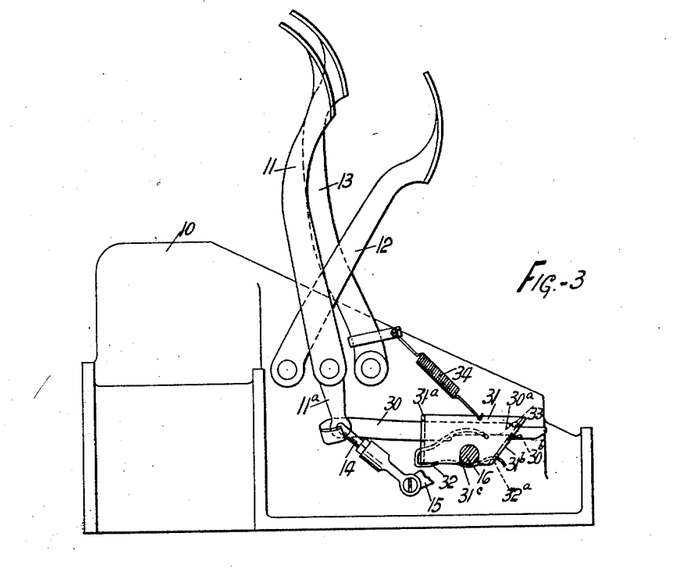
Figure 3 is a side elevation of a modified form of the invention.
Figure 4:
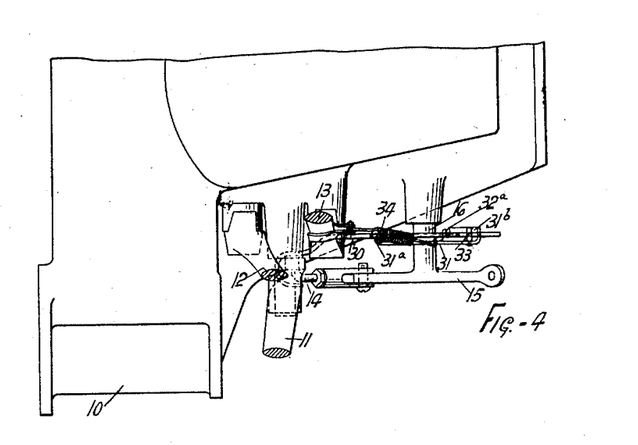
Figure 4 is a plan partly in section thereof.

Figures 3 and 4 illustrate a somewhat simpler form of the invention. In these views the standard transmission control parts are given the same designating numerals as in the preceding views. In this form a thrust member 30 is pivotally connected at one end to the pedal arm 11ª and is freely slidable through apertured flanges 31ª and 31ᵇ of a plate 31 mounted on clutch shaft 16 which has an open bearing 31ᶜ thereon and which is retained on the shaft 16 by a wire spring 32 one end of which is engaged in a notch at 32ª in flange 31ᵇ the spring passing under shaft 16 about the lower end of flange 31ª and back through an aperture in said flange so as to extend under member 30 to exert an upward yielding force thereon, the end of the spring being turned inwardly under member 30 for this purpose.

For indicating neutral position member 30 is provided with a rounded shoulder at 30ª and plate 31 has an abutment thereon, such a pin 33 permitting downwardly yielding of member 30 as the pedal 11 passes through the neutral position but offering such resistance to such movement at this point as to indicate the neutral position to the driver.

The plate 31 in this form of the invention is also employed as a latch, which is yieldingly connected to the brake pedal 13 by a tensile spring 34, the wire spring 32 engaging under shaft 16 serving to urge the plate 31 to released position. Thrust member 30 is formed with a shoulder at 30ᵇ adapted to be engaged by the flange 31ᵇ at the bottom of the aperture through which said thrust member extends as the plate is lifted by operation of the brake pedal 13. It is to be noted that spring 32 serves not only the double function of normally holding thrust rod 30 so as to indicate neutral and normally urging plate 31 to released position but also holds plate 31 on shaft 16.

Figure 5:
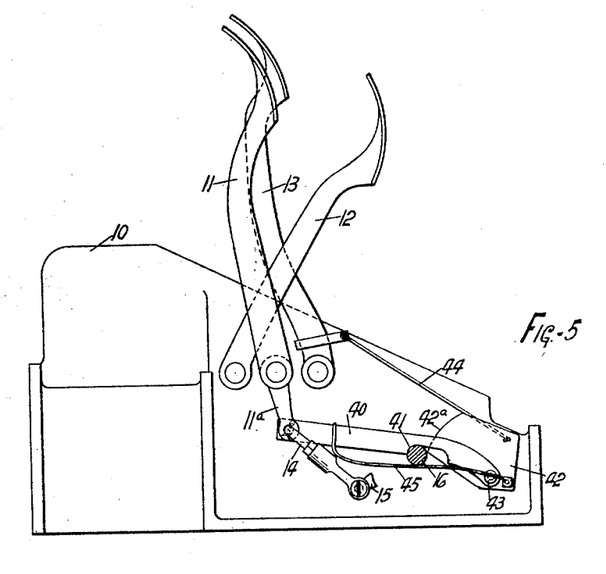
Figure 5 is a side elevation of another modified form of the invention.
Figure 6:
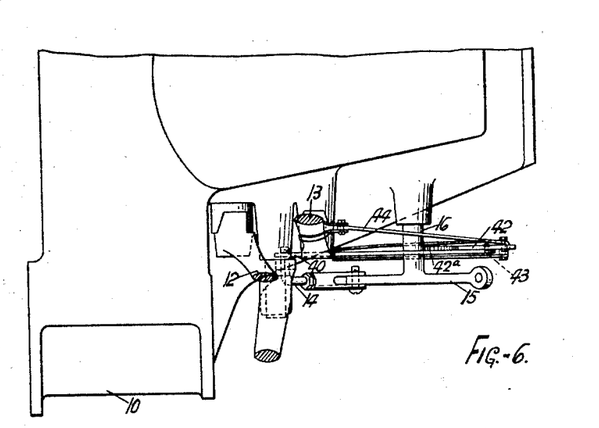
Figure 6 is a plan thereof.

Figures 5 and 6 illustrate a form of the invention in which the thrust member 40 is connected at one end to arm 11ª, the other end riding upon and cooperating with shaft 16 to indicate neutral. A shoulder 41 is provided on member 40 to engage the shaft 16 when the pedal 11 is at the neutral point. The latch plate 42 in this form of the invention is pivoted at 43 on member 40 and is connected by a link or rod 44 to the brake pedal 13. A wire spring 45 is secured on plate 42 and extended under shaft 16 and over thrust member 40 so as to yieldingly urge the member 40 downwardly against shaft 16 and also to yieldingly urge latch plate 42 upwardly. Plate 42 is provided with a portion 42ª adapted to be swung downwardly by operation of brake pedal 13 to hold member 40 and consequently pedal 11 in the neutral position.

In all the preceding forms of the invention the car is controlled exactly in the same manner as in the past, the operator or driver does not have any auxiliary controls to which his attention must be directed. In operating a car when the clutch is disengaged, the resistance offered by the neutral finder indicates when the pedal 11 is in its proper neutral position. When the brake is applied the devices automatically latch the pedal 11 against returning to high speed position without however affecting its operation into low position. The pedal is thus maintained in such a position as to prevent dragging of a control band or wearing of the clutch while the motor is disengaged for any purpose.

Figure 7:
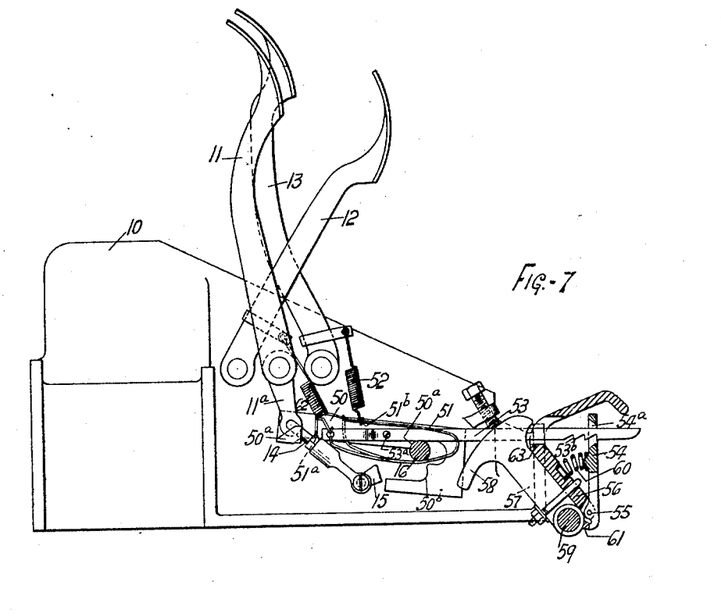
Figure 7 is a side elevation of another embodiment of the invention.
Figure 8:
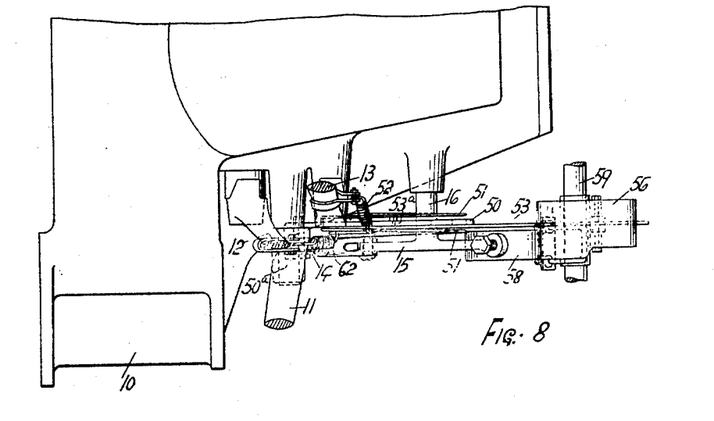
Figure 8 is a plan thereof partly in section.

Referring now to Figures 7 and 8, pivotally connected at one end to arm 11ª of pedal 11 is a thrust member 50, this end of said member having an aperture for mounting it on the pivot of the adjustable link 14 which in the standard construction extends through arm 11ª. For effectively retaining this end of the thrust member 50 on this pivot and yet permitting its easy application thereto, an ear 50ª is formed at this end of the thrust member so as to embrace the outer side of the link 14 and thus hold the thrust member and link in proper pivotal position on the arm 11ª without the use of the standard cotter pin and without replacing the standard adjustable link.

The thrust member 50 is arranged to ride in engagement with the shaft 16 and is yieldingly held in engagement therewith by a spring 51 embracing shaft 16, one end bearing upon the bottom of member 50 at 51ª fulcruming intermediate its ends at 51ᵇ, looped about and bearing against the under side of shaft 16 and secured at its other end upon itself or member 50 as intermediate points 51ª and 51ᵇ.

For indicating neutral the member 50 has a rounded shoulder 50ª thereon adapted to engage shaft 16 when pedal 11 is in neutral position and to ride over shaft 16 under the force of the pedal when going through neutral with sufficient resistance of spring 51 to indicate the neutral position to the driver.

A yielding connection in the form of a tensile spring 52 is made between the service brake pedal 13 and the member 50 whereby it will be swung upwardly by operation of the brake and a shoulder 50ᵇ is formed on a portion of member 50 extended around shaft 16, positioned thereto to be swung into engagement with shaft 16 to lock the pedal 11 in neutral position. So much of the device as has been described may be used as a neutral finder and neutral lock in conjunction with the standard control levers and operating automatically when these levers are operated in the normal manner without requiring any attention upon the part of the driver.

The device may however, be adapted for locking the transmission in low speed by pivotally connecting to the member 50 as for example, indicated at 53ª, a latch 53. Latch 53 is freely movable through an aperture 54ª in latch plate 54 pivoted at 55 upon a member 56 secured on the standard speed lever 57 carrying the cam 58 for operating the clutch lever 15 on shaft 16 to disengage the clutch when the standard emergency brake lever 59 is operated. The latch plate 54 is normally yieldingly urged rearwardly to an upright position by a spring 60 in which position it is limited by an abutment 61.

The latch 53 is normally held in released position by a spring which may be a member of spring 51 as shown. Engagement of the latch 53 to lock the transmission in low may be accomplished by the provision of a yielding connection such as a spring 62 between the latch 53 and the reverse pedal 12 so that upon slight movement of reverse pedal 12 forwardly when the pedal 11 is in low position latch 53 will be swung into engagement with latch plate 54, notches being formed at 53ᵇ to engage an edge of aperture 54ª, a plurality of notches being shown so that this engagement may be made at various points depending upon the adjustment of the band controlling the low speed gearing. The parts are now in such position that slight movement of the emergency lever rearwardly will compress spring 62 and thus tension is applied on latch 53 whereupon reverse pedal 12 may be released, the latch holding the transmission locked in low.

The above construction is such that by moving the emergency lever forwardly to release the latch 53, the pedal 11 will be released for its normal use. Moreover, the construction is also such that in case of emergency the emergency lever may be employed to apply the emergency brake, an abutment being provided at 63 on the member 56 for engaging the latch 53 as the lever 13 is swung automatically to disengage the latch from the locking plate.

Figure 9:
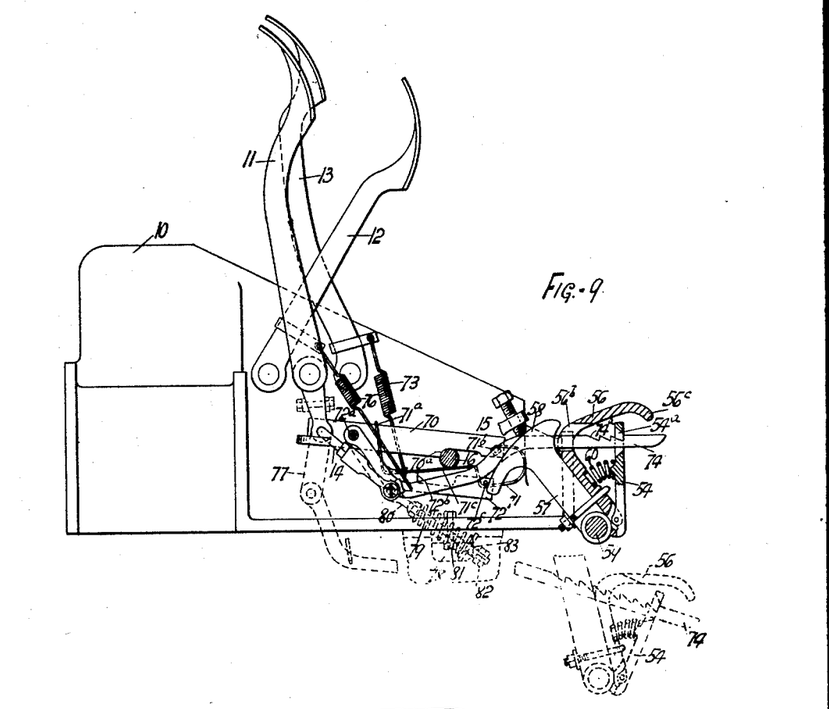
Figure 9 is a side elevation of another embodiment of the invention certain modifications thereof or attachments thereto being indicated in dotted lines.
Figure 10:
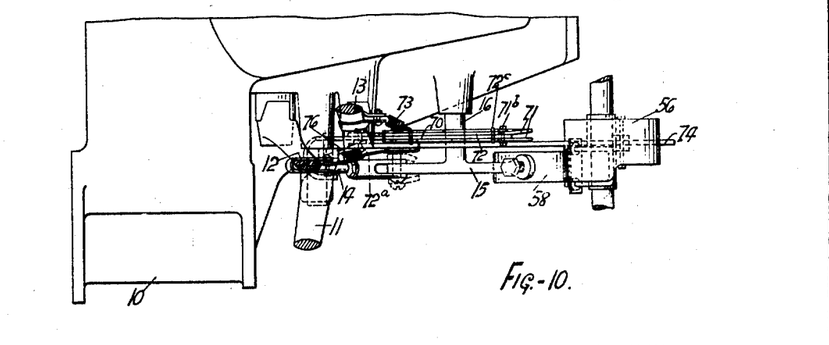
Figure 10 is a plan thereof partly in section.

Referring now to Figures 9 and 10, the thrust member 70 rides in engagement with shaft 16 and has a rounded shoulder 70ª thereon for engagement with shaft 16 when the parts are in neutral position. The spring 71 bears on top of member 70 at one end as indicated at 71ª, is fulcrumed thereon at its other end indicated at 71ᵇ and has a portion at 71ᶜ bearing against shaft 16.

A neutral lock member 72 is pivotally connected to the thrust member 70 as for example, at 72ª and has a shoulder thereon at 72ᵇ adapted to be engaged with shaft 16 when the parts are in neutral position by the pedal 13 which is yieldingly connected thereto by means of a spring 73. The spring 71 bears downwardly on the lock member 72 as for example, at the connection of spring 73 therewith, thus normally urging the member 72 to released position, such action being limited by engagement of a pin 72ᶜ on member 72 with spring 71.

A latch 74 is provided for use in locking the transmission in low speed. This latch is pivotally connected to thrust member 70 as at 72ª and cooperates with latch plate 54 in a manner similar to the latch 53 with the exceptions that the spring 76 connected to pedal 12 is arranged to lift the latch and accordingly the notches at 74ª are arranged on the upper edge of latch 74 and engage with the upper edge of aperture 54ª. So that the latch may be disengaged by application of the emergency brake the member 56 may be extended up over the latch 74 and may be apertured as at 56ᵇ so that the latch is freely movable therethrough, the upper portion of the member being bent downwardly to provide an abutment 56ᶜ for depressing the latch out of engagement when the emergency lever is swung rearwardly.

In some cases, for example, in trucks, it may be found desirable to apply increased leverage of the pedal 11 upon the latch. To this end the arm 11ª may have an extension 77 secured thereto and the latch 74 may be extended from the extension either through the latch plate device mounted on the standard emergency control of the pleasure car or the lower emergency control indicated in dotted lines which is used on trucks, the parts cooperating in exactly the same way to secure a locking of the transmission in low.

Provision of a neutral finder in which operation through neutral into low is accompanied by an increasing yielding resistance, has been found effective. Another attachment to the standard controls is indicated in dotted lines in Figure 9 for this purpose. This attachment comprises a bracket 78 adapted to be secured to the transmission housing, a shiftable rod 79 being slidable through an aperture in the bracket and being connected by a yoke 80 to the pivotal connection between the adjustable link 14 and the clutch shifting lever 15. A compression spring 81 normally under compression is arranged between the bracket and the yoke 80 as to be engaged and further compressed when the pedal is moving from neutral to low. Adjustment of the compression in this spring is provided for by threading nuts 82 onto rod 79, a spacer 83 being arranged on the rod so as to be urged against the spring and also providing a length of the rod permitting free travel thereof from neutral to high.

Figure 11:
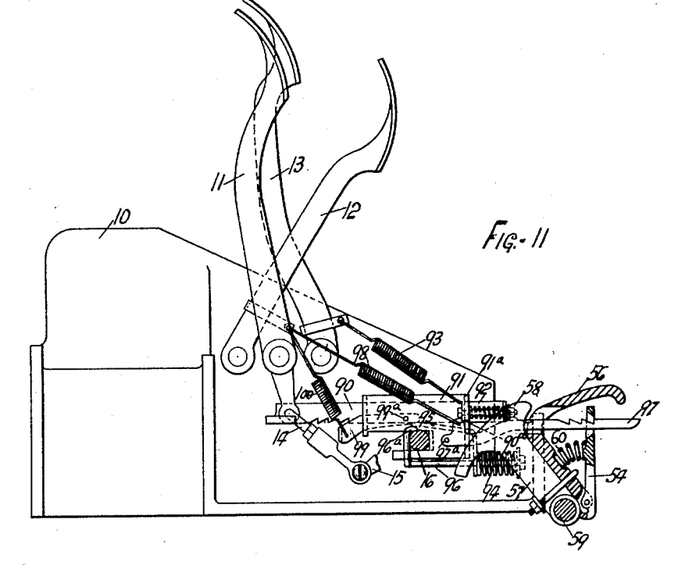
Figure 11 is a side elevation of a third embodiment of the invention.
Figure 12:
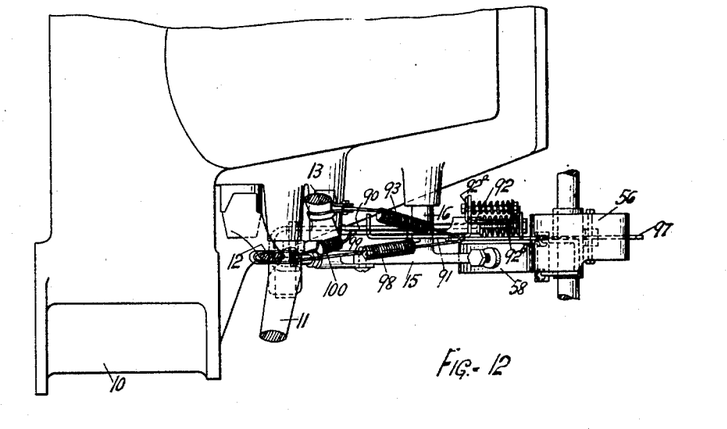
Figure 12 is a plan thereof partly in section.

The form of the invention shown in Figures 11 and 12, comprises a thrust member 90, a plate 91 mounted on shaft 16 in which member 90 is slidable, a pawl 92 pivotal at 92ª and yieldingly urged into the path of member 90 at 92ᵇ, affording yielding resistance to the movement of pedal 11 through neutral by engagement with the advancing end of member 90. For locking in neutral when the service brake is applied a spring 93 connects pedal 13 with plate 91 which is thus adapted to be rocked upwardly by the brake so that a flange 91ª through which member 90 normally freely slides will engage in a notch 90ª on the lower edge of member 90. A spring 94 is arranged to operate through a lever 95 to normally urge thrust member 90 and plate 91 to released position. A rod 96 on which spring 94 also acts, is hooked about shaft 16 as at 96ª for preventing shifting of plate 91 under the action of the neutral finder pawl 92.

This form of the device is adapted for locking the transmission in low speed by the provision of a latch 97 similar to latch 74 and cooperating with latch plate 54 in a similar manner, latch 97 being pivoted at 97ª on plate 91 and being operable by the reverse pedal 12 by means of a spring connection 98 and the emergency lever as will be understood from the description of the second form of the invention. In this particular construction the latch instead of being connected directly to the thrust member is arranged to be releasably connected thereto by provision of a latch 99 pivoted at 99ª on plate 91 and having a yielding connection by spring 100 to reverse pedal 12. Accordingly the construction is such that operation of the reverse pedal 12 a slight distance forwardly will latch both latches 97 and 99 whereupon by operation of the emergency lever a slight distance rearwardly the force thereof will be exerted through latch 97, plate 91, latch 99 and thrust member 90 to pedal 11 in low position, plate 91 moving rearwardly against spring 94 and further movement of emergency lever rearwardly to apply the emergency brakes will release latch 97 permitting spring 94 to urge plate 91 forwardly to its normal position, lever 95 being engaged under latch 99 to urge this latch to released position. When the reverse pedal 12 is subjected to its normal use as such, the yielding connection it has with the attachment of the invention is such as to permit such use without in any way affecting the normal operation of the car.

In the last three forms of the invention yielding resistance is offered to operation of the pedal 11 through neutral thus indicating or finding neutral for the driver. Application of the service brake 13 in all cases serves to operate a latch holding pedal 11 in neutral position. In each form of the lock in low disclosed, the operation is made semi-automatic in that a connection is made to the reverse pedal for initially latching the parts together so that operation of the emergency will lock the pedal 11 in low, safety being provided for by adapting the connection to the emergency to be self-releasable when the emergency brakes are applied for any reason.

It will be apparent that the initial latching operation by use of the reverse may be eliminated to render the device for locking in low fully automatic. It will also be apparent that any one of the features of the device or any two of the same in combination may be employed without sacrificing all of the benefits to be derived from the invention. For example, the neutral finder, neutral lock or lock-in-low may each be used independently or any two of these may be used in co-operation with each other as well as using the three features in cooperative relation as shown in Figures 6 to 12.

Accordingly, modifications of the invention other than those disclosed herein may be resorted to without departing from the spirit thereof or the scope of the appended claims.

What is claimed is:

1. A device for controlling motor vehicles employing a planetary transmission, pedal and emergency brake levers for controlling the vehicle, said device comprising a thrust member connected to the low speed and clutch pedal, and means cooperating with the thrust member for offering yielding resistance to operation of the pedal through neutral position.

2. A device for controlling motor vehicles of the type employing planetary transmissions comprising, in combination with the control levers, means for indicating neutral position of the low speed and clutch lever, means for locking the low speed and clutch in neutral by operation of the service brake lever, and means for locking the low speed and clutch lever in low speed position by combined operation of a second control lever and the emergency brake control lever, and means controlled by the emergency brake for releasing the low speed and clutch lever.

3. A device for controlling motor vehicles of the type employing planetary transmissions comprising, in combination with the control levers, means for indicating neutral position of the low speed and clutch lever, means for locking the low speed and clutch lever in neutral by operation of the service brake lever, means for locking the low speed and clutch lever in low speed position by operation of the emergency brake control lever, and means being adapted to release the low speed and clutch lever when the emergency lever is operated to apply the emergency brake.

4. A device for controlling motor vehicles of the type employing planetary transmissions comprising, in combination with the control levers, means for indicating neutral position of the low speed and clutch lever, means for locking the low speed and clutch lever in neutral by operation of the service brake lever, and means for locking the low speed and clutch lever in low speed position by operation of a second control lever.

5. A device for controlling motor vehicles of the type employing planetary transmissions comprising, in combination with the control levers, means for indicating neutral position of the low speed and clutch lever, means for locking the low speed and clutch lever in neutral by operation of the service brake lever, and means for locking the low speed and clutch lever in low speed position.

6. A control attachment for the low speed and clutch lever of motor vehicles employing planetary transmissions, said attachment including a member adapted to be pivotally mounted on the pivot of the clutch control link on the said lever and having an ear thereon embracing said link to retain the lever, link and attachment in operative relation.

7. The combination with the low speed and clutch lever and the clutch operating shaft of a motor vehicle employing planetary transmissions of a member movable by said lever and having an abutment thereon adapted to yieldingly engage said shaft as the lever is operated through neutral, and a latch operable by the brake lever and arranged to engage said shaft to secure said member so as to lock said lever in neutral position.

8. In combination, a combined planetary gear transmission control and clutch lever, means for offering yielding resistance to operation of said lever through neutral to indicate the neutral position thereof, said means including a bracket adapted to be attached to the transmission housing a member movable on the bracket, said member being adapted to be connected to a part of the clutch controlling mechanism, and a spring resisting movement of the member on the bracket.

9. A device for controlling motor vehicles employing a planetary transmission, pedal and emergency brake levers for controlling the vehicle, said device comprising a thrust member connected at one end to the low speed or clutch lever and a locking member adapted to lock the clutch lever in a neutral position, said locking member riding on said thrust member and having relative pivotal movement therewith, and yielding means connecting said locking member with the foot brake pedal whereby said relative pivotal movement is controlled.

10. In apparatus of the class described, a thrust member connected at one end to the clutch lever, a locking member on said thrust member and having relative movement therewith, and means operated by the foot brake controlling said relative movement whereby locking action between the locking member and the thrust member is controlled.

11. In apparatus of the class described, a thrust member connected at one end to the clutch lever, a locking member on said thrust member and having relative movement therewith, said locking member engaging with the clutch control pin, and means operated by the foot brake controlling said relative movement.

12. In apparatus of the class described, a thrust member connected at one end to the clutch lever, a locking member on said thrust member and having relative movement therewith, said locking member engaging with the clutch control pin, and means operated by the foot brake and attached to the locking member controlling said relative movement whereby locking of the clutch in neutral is controlled.

WILLIAMS G. MILLIGAN.